May 15, 1956     R. STEVENSON     2,745,434
FOUR WAY BALANCED PRESSURE VALVE
Filed Jan. 19, 1952     3 Sheets-Sheet 1
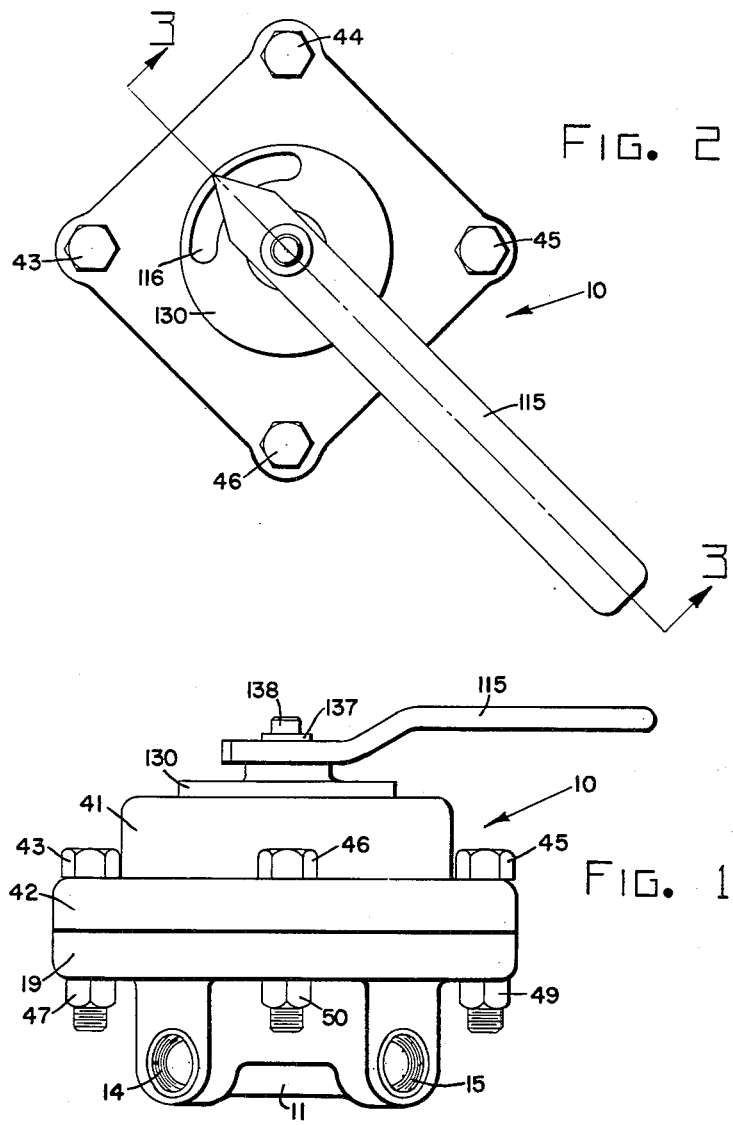
INVENTOR.
ROBERT STEVENSON
BY
William Frederick Werner
ATTORNEY May 15, 1956 R. STEVENSON 2,745,434
FOUR WAY BALANCED PRESSURE VALVE
Filed Jan. 19, 1952 3 Sheets-Sheet 2

INVENTOR.
ROBERT STEVENSON
BY
William Frederick Werner.
ATTORNEY

May 15, 1956 R. STEVENSON 2,745,434
FOUR WAY BALANCED PRESSURE VALVE
Filed Jan. 19, 1952 3 Sheets-Sheet 3

INVENTOR.
ROBERT STEVENSON
BY
William Frederick Werner
ATTORNEY

United States Patent Office 2,745,434
Patented May 15, 1956

2,745,434

FOUR WAY BALANCED PRESSURE VALVE

Robert Stevenson, Barrington, R. I., assignor to Anco, Inc., a corporation of Rhode Island Application January 19, 1952, Serial No. 267,214

2 Claims. (Cl. 137—625.43)

This invention relates to a four way balanced pressure valve and more particularly to the means employed to prevent the valve plug from binding in the valve seat.

One of the objects of the present invention is to provide means for balancing pressures on the valve plug so as to avoid the objectionable hard turning and quick wearing of the valve plug and valve seat.

Another object of the present invention is to provide a new, novel, positive acting, inexpensive, light in weight, long wearing four way balanced pressure valve.

Still other objects will become apparent in part and be pointed out in part in the following specification and claims.

In the past, four way valves have generally been of the frustro-conical cone type in which the fluid under pressure was used to unseat the valve plug rather than balance the valve plug in the valve seat. See for example Patent #2,229,933, issued to A. L. Parker on January 28, 1941, in which side ports 43, 44 are employed to unseat the valve plug and a direct flow to side cut outs 42 is made. Shutoff is accomplished by the valve plug resting against the side wall of the valve seat. The present invention contemplates a flat face shut off, employing a channel cut off rather than a side wall cut off. The present invention employs a balancing plug for each port and a conduit connecting each plug with a port to balance the pressure. Friction is reduced by having a four point bearing instead of a full surface carrying the operating pressure.

The frustro-conical plug is herein improved by having a straight wall plug which prevents unbalancing pressure from causing the plug to leak when the pressure is against the small end of the plug or seize when the pressure is on the large end of the plug.

The instant invention finds ready application as a four way balanced pressure valve in raising and lowering landing gear on airplanes. It may be used in hydraulic presses where, when the handle is in one position, hydraulic fluid under pressure causes a piston to move the press bed downwardly. When the handle is in the opposite position, hydraulic fluid under pressure causes the piston to move the press bed upwardly. It may be used in die casting machines or wherever four way valves are used.

Like reference numerals refer to like parts in the accompanying drawings in which:

Figure 1 is a side elevational view of the new and improved four way balanced pressure valve.

Figure 2 is a plan view of the same.

Figure 4:
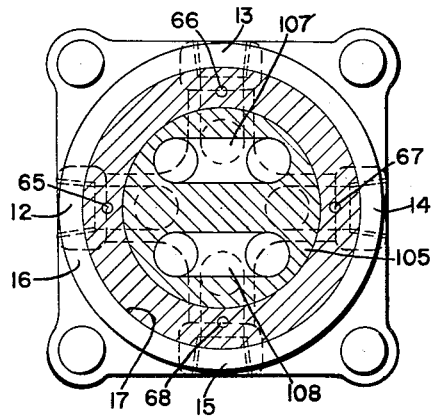
Figure 4 is a sectional view taken along line 4—4 of Figure 3 showing the valve plug channels out of engagement with the valve body ports.
Figure 3:
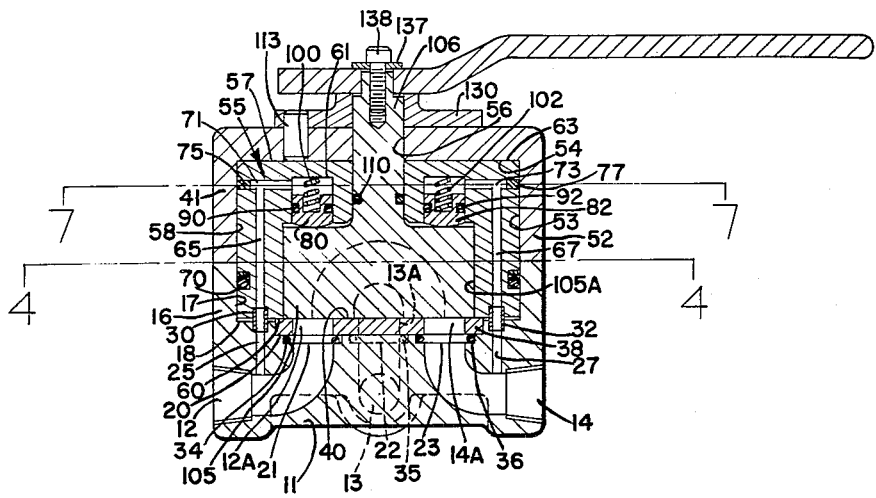
Figure 3 is a side view, in section, taken along line 3—3 of Figure 2 looking in the direction of the arrows.

Reference character 10 generally indicates the four way balanced pressure valve which consists of a lower housing 11, provided with two sets of ports 12, 13 and 14, 15. Each port is provided with pipe threads on the outboard end so that fluid pressure lines may be attached thereto.

Housing 11 has a raised cylindrical wall 16 which forms a chamber 17 having a base 18 provided with a cavity 20 which is provided with annular recesses 21, 22, 23 and 24 at the juncture of ports 12, 13, 14 and 15 with cavity 20.

Ducts 25, 26, 27 and 28 connect ports 12, 13, 14 and 15 with base 18. At this point of juncture the ducts are recessed to accommodate small pieces of tubing 30, 31, 32 and 33 for reasons, presently to be described.

Annular recesses 21, 22, 23 and 24 are adapted to accommodate a fluid tight packing material, which may be of any conventional type but which is shown, by way of example, to be neoprene O sealing rings 34, 35, 36 and 37.

A valve plate 38 provided with port extensions 12A, 13A, 14A and 15A sets in cavity 20 providing a cover for neoprene O sealing rings 34, 35, 36 and 37 and a seat 40 raised slightly above the level of base 18.

Upper housing 41 comprises a beaded edge 42 having four bolt holes adapted to accommodate bolts 43, 44, 45 and 46 which co-operate with bolt holes in beaded edge 19 of lower housing 11 to form a housing unit when nuts 47, 48, 49 and 50 attached to bolts 43, 44, 45 and 46 draw the beaded edges 42 and 19 tightly together.

Upper housing 41 has a raised cylindrical wall 52 which forms a chamber 53 having a ceiling 54. Wall 52 and wall 16 under the influence of bolts 43, 44, 45 and 46 meet edge to edge so that chamber 53 and chamber 17 form one smooth walled chamber adapted to accommodate a fluid balancing member 55.

Fluid balancing member 55 is essentially a closed end cylinder. The base 57 of the cylinder resting against ceiling 54. The outside of wall 58 of the cylinder setting in chambers 53 and 17. The end 60 of the cylinder bearing on valve plate 38.

The base 57 of the cylinder has a bore 56 and four chambers 61, 62, 63 and 64. Cylinder wall 58 is provided with four ducts 65, 66, 67 and 68 which form extensions of ducts 25, 26, 27 and 28. The ends of ducts 65, 66, 67 and 68 are recessed to accommodate tubing 30, 31, 32 and 33 which forms a fluidtight seal for said ducts at the juncture of base 18 and end 60 between which there is clearance.

The outside of wall 58 is provided with a groove adapted to accommodate a fluidtight packing material, which may be of any conventional type as heretofore stated but which is illustrated as comprising a neoprene O sealing ring 70 which compresses against chamber 17.

A second set of ducts 71, 72, 73 and 74 connect ducts 65, 66, 67 and 68 with chambers 61, 62, 63 and 64 respectively. Plugs 75, 76, 77 and 78 are used to seal off the ends of ducts 71, 72, 73 and 74 created as a manufacturing expediency.

Balance plugs 80, 81, 82 and 83 are provided with grooves adapted to house a fluidtight packing, such as neoprene O sealing rings 90, 91, 92, and 93, fit in chambers 61, 62, 63 and 64 forming a fluidtight seal therein. Balance plugs 80, 81, 82 and 83 are provided with cavities adapted to house springs 100, 101, 102 and 103 which set between the base 57 and the bottom of the cavities. Balance plugs 80, 81, 82 and 83 have one end convexed.

A valve plug consisting of a cylindrical body 105 and an integrally formed cylindrical stem 106 is provided with two arched passageways 107 and 108 in said body 105 and with a groove 110 adapted to house a fluid packing material illustrated as a neoprene O sealing ring in said stem 106 which is shaped square on its outboard end which includes a tapped hole.

Cylindrical body 105 is seated in bore 105A and is urged against valve plate 38 by the force of springs 100, 101, 102, and 103 acting against balance plugs 80, 81, 82 and 83 respectively.

A positioning ring 130 is secured to stem 106 in any conventional manner such as key and keyway. A dowel 113 is secured in upper housing 41 by means of a drive fit into a reamed hole. A handle 115 provided with a square bearing adapted to be accommodated by square end of stem 106 is held in position on said stem 106 by means of a washer 137 held in position by a screw 138 which is accommodated in the tapped hole in the end of said stem 106. A ninety degree arcuate recess 116 is provided in positioning ring 130 so that the ends of arcuate recess 116 may abut against dowel 113 which acts as a stop for said ring 130 and handle 115.

Figure 6:
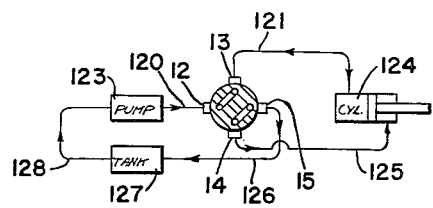
Figure 6 is a diagrammatic view illustrating one application of a four way valve.
Figure 7:
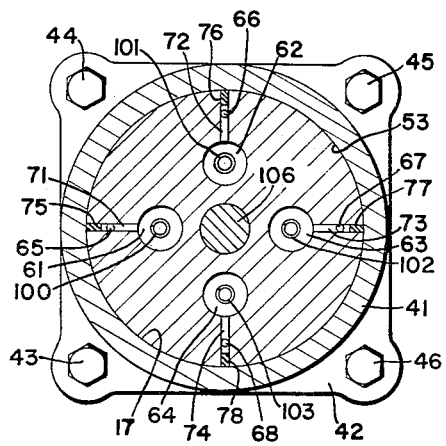
Figure 7 is a sectional view taken along line 7—7 of Figure 3.

In operation four way balancing valve 10 will be set in a system similar to the illustration depicted in Figure 6. Ports 12 and 13 will unite fluid pressure lines 120 and 121 with pump 123 and one end of cylinder 124. Ports 14 and 15 will unite fluid pressure lines 125 and 126 with the other end of cylinder 124 and a tank 127. Tank 127 and pump 123 are connected by means of fluid pressure line 128.

In the position of the valve plug shown in Figure 4, all four ports 12, 13, 14 and 15 are blocked out so that the fluid pressure is static. Handle 115 is in the position shown in Figure 2.

Assume that handle 115 is turned to the extreme right. That is arcuate recess 116 has its right hand end abutting dowel 113 (Figure 2). Port 12 will be in communication with port 13 through arched passageway 107. Port 14 will be in communication with port 15 through arched passageway 108. In that position, fluid under pressure coming from pump 123 passing through ports 12 and 13 will force the piston in cylinder 124 to the position shown in Figure 6. Fluid from the rear of said piston will return through port 14 to port 15 through arched passageway 108 to tank 127. Fluid in port 12 will travel through ducts 25, 65 and 71 to chamber 61 and plug 80. Similarly fluid in port 13 will travel through ducts 26, 66 and 72 to chamber 62 and plug 81. Fluid in port 14 will travel through ducts 27, 67 and 73 to chamber 63 and plug 82. Fluid in port 15 will travel through ducts 28, 68 and 74 to chamber 64 and plug 83. The pressure on plugs 80, 81, 82 and 83 will be equal to the pressure exerted in arched passageways 107 and 108, thereby balancing the valve plug. When the pressure is static in the system, it will still follow the paths described so that the pressure on plugs 80, 81, 82 and 83 will be equal to the pressure in ports 12, 13, 14 and 15 exerted against the bottom of cylindrical body 105. Thus it will be seen that at no time can the valve plug become pressure bound. Handle 115 can always be turned with great ease, regardless of the pounds per square inch exerted by the fluid passing through the valve 10.

The fluidtight packings shown as neoprene O rings will prevent fluid from escaping beyond the valve 10 itself or into undesirable sections of the valve 10.

Figure 5:
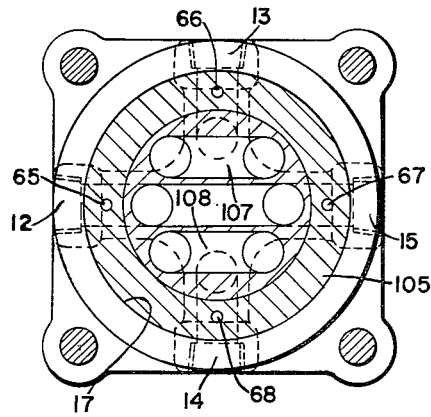
Figure 5 is a view similar to Figure 4 showing a modified form of valve plug.

The modified form shown in Figure 5 eliminates the need for pressure relief valves or unloading valves in the system. It operates on a handle turn of forty-five degrees instead of ninety degrees. It differs from the form shown in Figure 4, in that ports 12 and 14 are in communication when the valve is shut off so that fluid under pressure can bypass valve 10 instead of being blocked out by means of the bottom of valve plug 104.

Having shown and described a preferred embodiment of the present invention, I do not wish to limit myself to the exact structure shown, as modifications can be made within the spirit of the invention and scope of the advancement made in the art.

What I claim is:

1. A four way balanced pressure valve comprising a lower housing having a beaded edge with bolt holes therein, provided with four ports having pipe threads in the outboard ends, a raised cylindrical wall, forming a first chamber having a base provided with a cavity, annular recesses in the ends of said ports at the juncture of said cavity, ducts connecting said ports with said base, a valve plate having four ports adapted to cooperate with said ports in said lower housing, a fluidtight packing material in said annular recesses beneath said valve plate, an upper housing comprising a beaded edge with bolt holes adapted to be alined with the bolt holes in said lower housing, bolts and nuts in said bolt holes securing said beaded edges together, a cylindrical wall forming a second chamber in alignment with said first chamber in said lower housing, a ceiling in said second chamber, a bore in said ceiling, a fluid balancing member in said first and second chambers, consisting of a closed end cylinder, the base of said cylinder bearing against said ceiling, the end of said cylinder bearing against said valve plate, the base of said cylinder having a bore and four chambers, the cylinder having four ducts in alignment with said ducts in said lower housing on one end and engaging each of said four chambers individually on the other end, tubing fixed in the cylinder wall ducts and lower housing ducts, the outside wall of said cylinder having a recess adapted to house a fluidtight sealing material engaging said chamber in said lower housing, balancing plugs provided with grooves adapted to house a fluid tight sealing material spring pressed in each of said four chambers, a valve plug comprising a cylindrical body and a cylindrical stem, arched passageways in said body, a groove in said stem adapted to house a fluidtight sealing material bearing against said bore in said fluid balancing member, a square end on said stem adapted to house a handle, said balancing plugs engaging said valve plug, said arched passageways engageable and disengageable with a combination of any two of said four ports.

2. The same as claim 1 having the additional limitations of, the valve plate face accommodating said valve plug being slightly higher than said base, the balancing plugs having cavities adapted to house said springs, said balancing plugs having convexed faces contacting said valve plug, a positioning ring secured to said stem, a dowel secured in said upper housing, and a ninety degree arched recess provided in said positioning ring adapted to endwise contact said dowel.

References Cited in the file of this patent
UNITED STATES PATENTS

| 925,692 | Gold | June 22, 1909 |
| 1,081,322 | Murphy | Dec. 16, 1913 |
| 1,614,124 | Hansen | Jan. 11, 1927 |
| 1,669,424 | Schneider | May 15, 1928 |
| 2,079,774 | Shipley | May 11, 1937 |
| 2,688,981 | Greer | Sept. 14, 1954 |

FOREIGN PATENTS

| 118,688 | Australia | of 1944 |
| 1,263 | Great Britain | Apr. 4, 1873 |